(12) United States Patent
Muff

(10) Patent No.: US 9,696,422 B2
(45) Date of Patent: Jul. 4, 2017

(54) SYNTHETIC APERTURE RADAR SYSTEM

(71) Applicant: THE SECRETARY OF STATE FOR DEFENCE, Salisbury, Wiltshire (GB)

(72) Inventor: Darren George Muff, Salisbury (GB)

(73) Assignee: The Secretary of State for Defence, Salisbury, Wiltshire (GB)

( * ) Notice: Subject to any disclaimer, the term of this patent is extended or adjusted under 35 U.S.C. 154(b) by 284 days.

(21) Appl. No.: 14/399,532

(22) PCT Filed: May 8, 2013

(86) PCT No.: PCT/GB2013/000198
§ 371 (c)(1),
(2) Date: Nov. 7, 2014

(87) PCT Pub. No.: WO2013/167854
PCT Pub. Date: Nov. 14, 2013

(65) Prior Publication Data
US 2015/0160337 A1      Jun. 11, 2015

(30) Foreign Application Priority Data

May 8, 2012 (GB) .................................. 1207967.9

(51) Int. Cl.
*G01S 13/90* (2006.01)
(52) U.S. Cl.
CPC .......... *G01S 13/9035* (2013.01); *G01S 13/90* (2013.01); *G01S 2013/9058* (2013.01)
(58) Field of Classification Search
CPC .............................. G01S 13/90; G01S 13/9035

USPC ............................................... 342/25 R–25 F
See application file for complete search history.

(56) References Cited

U.S. PATENT DOCUMENTS

| | | | |
|---|---|---|---|
| 5,332,999 A * | 7/1994 | Prati | G01S 13/9035 342/25 F |
| 5,495,248 A | 2/1996 | Kawase et al. | |
| 5,673,050 A * | 9/1997 | Moussally | G01S 13/0209 342/22 |
| 5,949,364 A * | 9/1999 | Katzberg | G01S 13/003 342/25 A |
| 6,388,606 B1 * | 5/2002 | Keydel | G01S 7/03 342/159 |

(Continued)

FOREIGN PATENT DOCUMENTS

| CN | 1346059 A | 4/2002 |
|---|---|---|
| CN | 101692128 A | 4/2010 |

(Continued)

OTHER PUBLICATIONS

International Preliminary Report on Patentability dated Nov. 11, 2014 in Application No. PCT/GB2013/000198.

(Continued)

*Primary Examiner* — Marcus Windrich
(74) *Attorney, Agent, or Firm* — Dean W. Russell; Kilpatrick Townsend & Stockton LLP

(57) ABSTRACT

Low cost, generally broad bandwidth synthetic aperture radar systems are detailed. The systems may be bistatic and include analog to digital converters in ground based receivers while transmitters and analogoue repeaters may be space-borne or airborne. Methods of producing synthetic aperture radar images also are detailed.

13 Claims, 1 Drawing Sheet

(56) References Cited

U.S. PATENT DOCUMENTS

| | | | | |
|---|---|---|---|---|
| 6,864,828 B1* | 3/2005 | Golubiewski | ....... | G01S 13/9023 342/147 |
| 7,911,372 B2* | 3/2011 | Nelson | .................. | G01S 13/003 342/179 |
| 2007/0247353 A1* | 10/2007 | Budic | .................... | G01S 7/414 342/159 |
| 2009/0102705 A1* | 4/2009 | Obermeyer | ............. | G01S 13/90 342/25 F |
| 2010/0007549 A1* | 1/2010 | Smith | ................ | G01S 13/9035 342/25 A |
| 2010/0039313 A1* | 2/2010 | Morris | .................... | G01S 13/90 342/25 F |

FOREIGN PATENT DOCUMENTS

| | | | |
|---|---|---|---|
| EP | 2339370 | A1 | 6/2011 |
| GB | 2299908 | A | 10/1996 |
| JP | 60170777 | A | 9/1985 |
| JP | 61213783 | A | 9/1986 |
| JP | 62008081 | A | 1/1987 |
| JP | 2000235074 | A | 8/2000 |
| WO | 2007148199 | A2 | 12/2007 |
| WO | 2007148199 | A3 | 12/2007 |

OTHER PUBLICATIONS

Search Report dated Jun. 25, 2012 in Application No. GB1207967.9.
International Search Report and Written Opinion dated Jul. 15, 2013 in Application No. PCT/GB2013/000198.
Combined Search and Examination Report dated Sep. 4, 2013 in Application No. GB1308206.0.

* cited by examiner

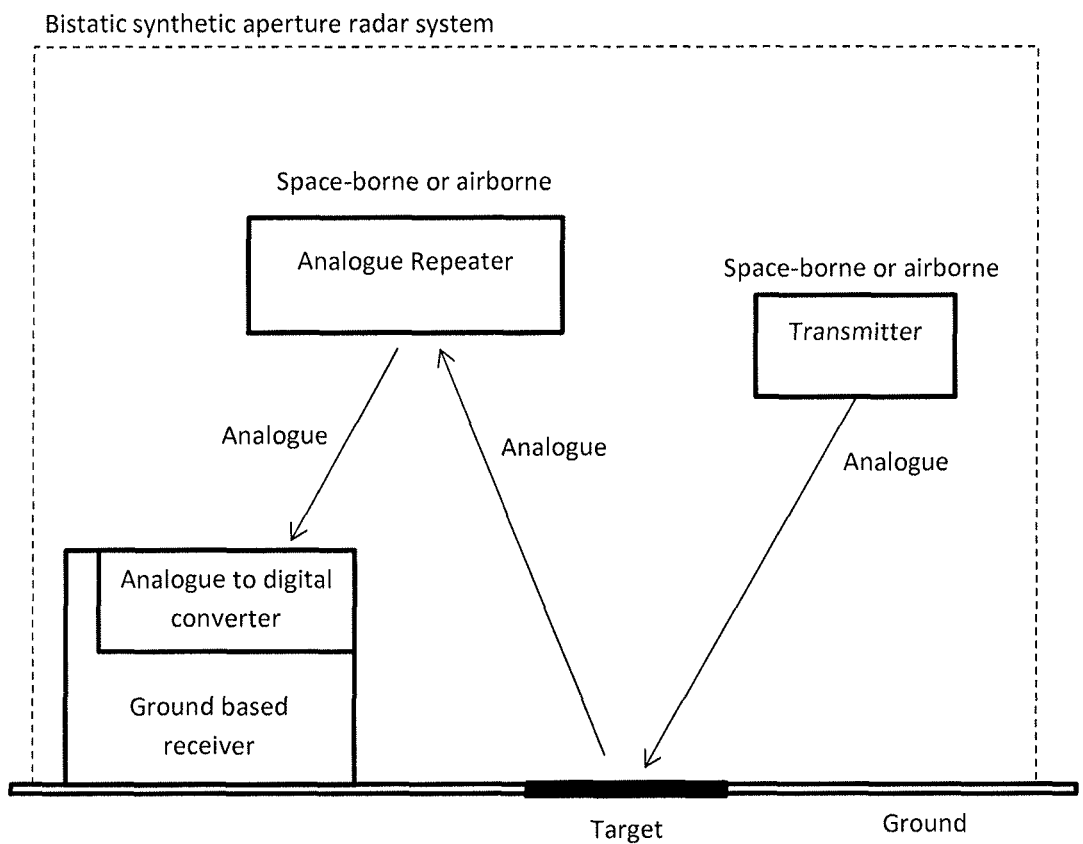

SYNTHETIC APERTURE RADAR SYSTEM

CROSS REFERENCE TO RELATED APPLICATIONS

This application is the U.S. national phase of International Application No. PCT/GB2013/000198 filed on May 8, 2013, and published in English on Nov. 14, 2013 as International Publication No. WO 2013/167854 A1, which application claims priority to Great Britain Patent Application No. 1207967.9 filed on May 8, 2012, the contents of both of which are incorporated herein by reference.

FIELD OF THE INVENTION

The present application is generally concerned with providing low cost and affordable SAR systems.

BACKGROUND OF THE INVENTION

Space based synthetic aperture radar (SAR) systems have dramatically increased in number over recent years and will continue to do so. There is expected to be more than 50 SAR sensors in orbit by 2017 comprising civil remote sensing, but increasingly military and intelligence collection platforms.

SUMMARY OF THE INVENTION

In a first aspect the present invention provides a synthetic aperture radar system comprising a transmitter, an analogue repeater, and a ground based receiver, wherein: the ground based receiver comprises an analogue to digital converter, the transmitter is space-borne or airborne, the analogue repeater is space-borne or airborne, the synthetic aperture radar system is a bistatic radar system.

BRIEF DESCRIPTION OF THE DRAWING

The FIGURE schematically illustrates aspects of an exemplary bistatic synthetic aperture radar system of the present invention.

DETAILED DESCRIPTION

The Applicant has recognised that more than 60% of the costs of any SAR system are related to the receiving of RADAR pulses, the digitisation of the received pulses and the storage and onward transmission of the radar data. This can be further compounded if on-board SAR processing is employed to convert received radar pulses into a SAR image. A high proportion of this cost is associated with producing receivers capable of functioning on a space-borne platform, or, to a lesser extent, airborne platform. Moreover, it is difficult to maintain or upgrade space-borne or airborne receivers because of the costs associated with grounding and replacing such systems. Thus, to reduce the costs of a SAR system the space-borne, or airborne, components of such a system should be limited to the transmission and/or reflection of radar pulses. The problem of cost, but also the problems associated with maintaining and upgrading receiver elements, can be solved by providing ground-based digitization, storage and processing. In this way, expensive digital receiving equipment can be replaced with much cheaper analogue components. The radar pulses are then received and digitised on the ground with low cost electronic components and computer processors.

A ground based receiver can be used to form imagery from anywhere within the illuminated beam providing it has an adequate line of sight to the illuminated area to be imaged. For this purpose the analogue repeater is either space-borne or airborne: the higher the latitude, the further the line of sight.

Receiving the radar data is preferably performed bistatically via an airborne platform. Bistatic operation can provide SAR imagery in exactly the same way as a traditional SAR system but it has additional flexibility that allows it to be operated using forward-scattered radar energy. This is particularly useful for the detection of radar-stealthy targets. It also permits exploiters to task the transmitter in unique operating modes such as looking for reflections through adits and tunnels. A major limitation of any monostatic SAR system is the severe reduction in received radar power which drops off as the inverse of the range from the sensor to target raised to the fourth power. Having the receiver/repeater considerably closer to the target area (i.e. not space-borne) improves the sensitivity of the system (of the order of 50 dB). This means that shadows appear darker and low radar cross section targets are more easily discriminated from their clutter background.

The improvements to SAR system sensitivity through use of an airborne platform repeater means that higher radar frequencies that usually suffer from tropospheric absorption (e.g. Ka-band) could now be employed. Higher frequencies provide many benefits to a space-based SAR system including a higher antenna gain for the same size antenna, further increasing power density on the ground, shorter duration synthetic apertures for the same azimuth resolution which increases the potential number of RADAR transmit tasks per orbit, and SAR imagery taken at higher centre frequencies is easier to interpret (for the same resolution and sensitivity).

Most SAR systems transmit a bandwidth and waveform constrained by the system's ability to receive and digitise it. If the satellite segment is not used for reception then more adventurous waveform and bandwidths can be transmitted. These could potentially provide unique solutions to existing intelligence problems such as ultra high resolution and spectral diversity for building, ground or foliage penetration.

Arranging for the receiving, storage and digital manipulation to be ground based will allow small institutions, such as colleges and universities, to enter into the SAR arena as the cost to these lower end users will be significantly reduced. They will be able to develop SAR collection and image processing techniques without being constrained to any vendor specific SAR processing algorithm. This approach thus leverages the network effect and will seed a development of advanced SAR processing and exploitation techniques to a much larger base of lower end users.

In one embodiment, the transmitter will be able to provide a wide variety of digital waveforms covering a range of frequencies. Moreover, ideally the waveform generation would be able to be configured on the ground so that as SAR capabilities are discovered they can be used experimentally or operationally with a reduced financial cost. Preferably, such a system would provide both low centre frequencies (e.g. 300 MHz) and higher frequencies (e.g. 35 GHz and above) and be able to transmit bandwidths of many GHz.

In order to maximize the flexibility of the transmitted waveforms there may be challenges for the type of antenna used and its characteristics. Tradeoffs would need to be considered that permit a wide range of transmitter frequencies used.

The re-broadcast component of the SAR system requires an airborne platform to preferably have a high bandwidth communications package (repeater) on-board. Whilst this may seem like an additional financial overhead for an operational system it should be remembered that the airborne system does not have a radar receiver (or even a transmitter) on board, many airborne platform systems would benefit from increasing their communications payload (e.g. the dissemination of already collected imagery to other consumers), and a ground based system would not need to re-broadcast, and could provide image formation at its location.

The SAR system of this application will dramatically reduce the vehicle costs of an orbital SAR system whilst also maximizing the opportunities for scientific innovation and collaboration. In addition, it could have a dual role providing a unique intelligence gathering capability that has not previously been employed. The ability to perform R&D using real data and then apply the findings of that research is a major advantage.

In a second aspect the present invention provides a method of producing a synthetic aperture radar image comprising: transmitting an analogue signal from a space-borne or airborne transmitter to a surface to be imaged, reflecting the analogue signal from the surface to a space-borne or airborne analogue repeater, transmitting the analogue signal from the airborne analogue repeater to a ground based receiver, converting the analogue signal received by the ground based receiver into a digital signal, processing the digital signal to create the synthetic aperture radar image, wherein, the method is performed bistatically.

Particularly in embodiments where the signal passes a comparatively short distance through the atmosphere (a particular example being where the analogue repeater is airborne) higher radio frequencies can be utilised than are normally used in synthetic aperture radar systems. At these frequencies it is possible to move the analogue repeater a shorter distance to collect sufficient data to generate an image. This equates to a shorter journey duration (e.g. for an aeroplane) which reduces the 'shutter speed' of the image and enables sharper images of moving target objects. This benefit can be particularly obtained at a frequency in excess of 30 GHz, more so in excess of 35 GHz, more so in excess of 40 GHz, more so in excess of 45 GHz, more so in excess of 50 GHz, and more so in excess of 55 GHz. When referring to the frequency of a signal, this relates to a carrier frequency as the signal typically includes frequency modulation either side thereof.

The invention claimed is:

1. A synthetic aperture radar system comprising a transmitter, an analogue repeater, and a ground based receiver, wherein:
   the ground based receiver comprises an analogue to digital converter,
   the transmitter is space-borne or airborne,
   the analogue repeater is space-borne or airborne,
   the synthetic aperture radar system is a bistatic radar system.

2. The synthetic aperture radar system of claim 1, where the analogue repeater is airborne.

3. The synthetic aperture radar system of claim 2, where the transmitter is space-borne.

4. The synthetic aperture radar system of claim 1 where the analogue repeater is adapted to operate at a frequency of at least 30 GHz, at least 40 GHz or at least 50 GHz.

5. The synthetic aperture radar system of claim 1, where the transmitter is adapted to operate in at least two frequency ranges including a first frequency band around 300 MHz and a second frequency band at at least 35 GHz.

6. The synthetic aperture radar system of claim 1, where the analogue repeater is adapted to operate at the Ka-band.

7. A method of producing a synthetic aperture radar image comprising:
   transmitting an analogue signal from a space-borne or airborne transmitter to a surface to be imaged,
   reflecting the analogue signal from the surface to a space-borne or airborne analogue repeater,
   transmitting the analogue signal from the airborne analogue repeater to a ground based receiver,
   converting the analogue signal received by the ground based receiver into a digital signal,
   processing the digital signal to create the synthetic aperture radar image, wherein, the method is performed bistatically.

8. The method of producing a synthetic aperture radar image of claim 7, where the analogue repeater is airborne.

9. The method of producing a synthetic aperture radar image of claim 8, where the transmitter is space-borne.

10. The method of producing a synthetic aperture radar image of claim 7, where the analogue repeater operates at a frequency of at least 30 GHz, at least 40 GHz or at least 50 GHz.

11. The method of producing a synthetic aperture radar image of claim 7, where the transmitter is adapted to operate in at least two frequency ranges including a first frequency band around 300 MHz and a second frequency band at at least 35 GHz, and the step of transmitting the analogue signal is performed at at least one of the first and second frequency bands.

12. The method of producing a synthetic aperture radar image of claim 7, where the analogue repeater operates at the Ka-band.

13. The method of producing a synthetic aperture radar image of claim 7, where the step of processing the digital signal includes the step of first transmitting the digital signal across a network.

* * * * *